United States Patent
Yoon et al.

(10) Patent No.: US 12,119,491 B2
(45) Date of Patent: Oct. 15, 2024

(54) POSITIVE ELECTRODE ACTIVE MATERIAL PRECURSOR AND PREPARATION METHOD OF POSITIVE ELECTRODE ACTIVE MATERIAL PRECURSOR

(71) Applicant: LG Chem, Ltd., Seoul (KR)

(72) Inventors: Ju Han Yoon, Daejeon (KR); Kyoung Wan Park, Daejeon (KR); Hyeon Jin Kim, Daejeon (KR); Song Yi Yang, Daejeon (KR); Young Su Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 17/799,024

(22) PCT Filed: May 26, 2021

(86) PCT No.: PCT/KR2021/006526
§ 371 (c)(1),
(2) Date: Aug. 11, 2022

(87) PCT Pub. No.: WO2021/241995
PCT Pub. Date: Dec. 2, 2021

(65) Prior Publication Data
US 2023/0084633 A1   Mar. 16, 2023

(30) Foreign Application Priority Data
May 29, 2020   (KR) .......................... 10-2020-0064875

(51) Int. Cl.
*C01G 53/04* (2006.01)
*C01G 53/00* (2006.01)
(Continued)

(52) U.S. Cl.
CPC ............ *H01M 4/525* (2013.01); *C01G 53/04* (2013.01); *C01G 53/50* (2013.01); *H01M 4/505* (2013.01);
(Continued)

(58) Field of Classification Search
CPC .............. C01P 2004/53; C01P 2004/61; C01P 2004/84; C01P 2006/10; C01P 2006/11;
(Continued)

(56) References Cited

U.S. PATENT DOCUMENTS 11,417,875 B2* 8/2022 Hong .................... H01M 4/366
2014/0087263 A1 3/2014 Matsumoto et al.
(Continued)

FOREIGN PATENT DOCUMENTS

EP        3734720 A1     11/2020
JP     2017202971 A     11/2017
(Continued)

OTHER PUBLICATIONS

Extended European Search Report including Written Opinion for Application No. 21814291.7 dated Jul. 4, 2023, pp. 1-7.
(Continued)

*Primary Examiner* — Hoa (Holly) Le
(74) *Attorney, Agent, or Firm* — Lerner David LLP

(57) ABSTRACT

A method of preparing a bimodal positive electrode active material precursor and a positive electrode active material prepared from the same are disclosed herein. In some embodiments, the method includes inputting a first reaction source material including a first aqueous transition metal solution into a reactor, precipitating at pH 12 or more to induce nucleation of a first positive electrode active material precursor particle, and at less than pH 12 to induce growth of the same, inputting a second reaction source material including a second aqueous transition metal solution into the
(Continued)

reactor containing the first positive electrode active material precursor particle, precipitating at pH 12 or more to induce the nucleation of a second positive electrode active material precursor particle, and at less than pH 12 to induce simultaneous growth of the first and second positive electrode active material precursor particles, thereby preparing a bimodal positive electrode active material precursor.

9 Claims, 2 Drawing Sheets

(51) Int. Cl.
    *H01M 4/505* (2010.01)
    *H01M 4/525* (2010.01)
    *H01M 10/0525* (2010.01)
    *H01M 4/02* (2006.01)

(52) U.S. Cl.
    CPC ..... *H01M 10/0525* (2013.01); *C01P 2002/52* (2013.01); *C01P 2004/03* (2013.01); *C01P 2004/53* (2013.01); *C01P 2004/61* (2013.01); *C01P 2004/84* (2013.01); *C01P 2006/10* (2013.01); *C01P 2006/11* (2013.01); *C01P 2006/40* (2013.01); *H01M 2004/028* (2013.01)

(58) Field of Classification Search
    CPC ...... C01G 53/04; C01G 53/006; C01G 53/44; C01G 53/50
    See application file for complete search history.

(56) References Cited

U.S. PATENT DOCUMENTS

| | | |
|---|---|---|
| 2017/0050864 A1 | 2/2017 | Matsumoto et al. |
| 2017/0317344 A1 | 11/2017 | Tan et al. |
| 2017/0324092 A1 | 11/2017 | Yoshida et al. |
| 2018/0233740 A1* | 8/2018 | You .................. H01M 4/131 |
| 2019/0263675 A1* | 8/2019 | Yoshida ............... C01G 51/42 |
| 2019/0341598 A1 | 11/2019 | Nam et al. |
| 2020/0052296 A1 | 2/2020 | Yoshida et al. |
| 2020/0259173 A1 | 8/2020 | Kim et al. |
| 2020/0373573 A1* | 11/2020 | Kim .................. H01M 4/525 |
| 2021/0328216 A1* | 10/2021 | Katagiri ............. C01G 53/006 |
| 2021/0363027 A1 | 11/2021 | Toma et al. |
| 2022/0009791 A1* | 1/2022 | Yang ................. H01M 4/0497 |
| 2023/0135908 A1* | 5/2023 | Takahashi ............ H01M 4/525 429/223 |

FOREIGN PATENT DOCUMENTS

| | | |
|---|---|---|
| KR | 20160099876 A | 8/2016 |
| KR | 101748999 B1 | 6/2017 |
| KR | 20170063420 A | 6/2017 |
| KR | 101815779 B1 | 1/2018 |
| KR | 101860625 B1 | 5/2018 |
| KR | 101860596 B1 | 7/2018 |
| KR | 20190055700 A | 5/2019 |
| KR | 20190057951 A | 5/2019 |
| KR | 20190068474 A | 6/2019 |
| KR | 20190078498 A | 7/2019 |
| WO | 2019013053 A1 | 1/2019 |
| WO | 2019163846 A1 | 8/2019 |

OTHER PUBLICATIONS

Search Report dated Aug. 25, 2023 from Office Action for Chinese Application No. 202180013039.5 dated Aug. 30, 2023. 3 pages. (see pp. 1-2, categorizing the cited references).

International Search Report for Application No. PCT/KR2021/006526 dated Sep. 1, 2021, 3 pages.

\* cited by examiner

[FIG. 1]
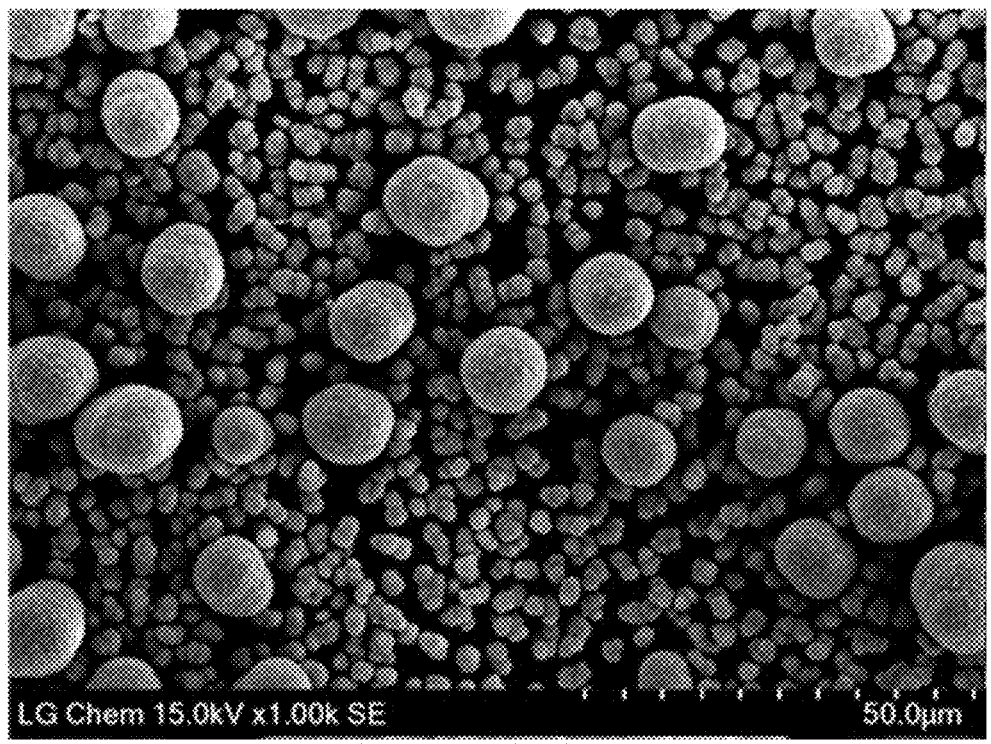
[FIG. 2]
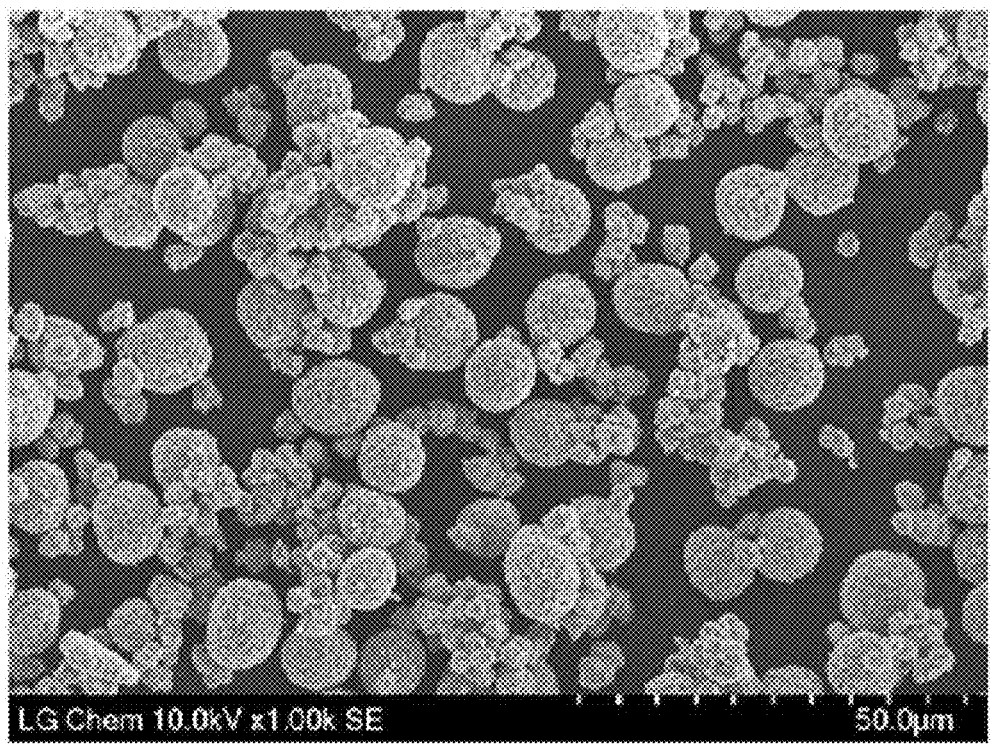

[FIG. 3]
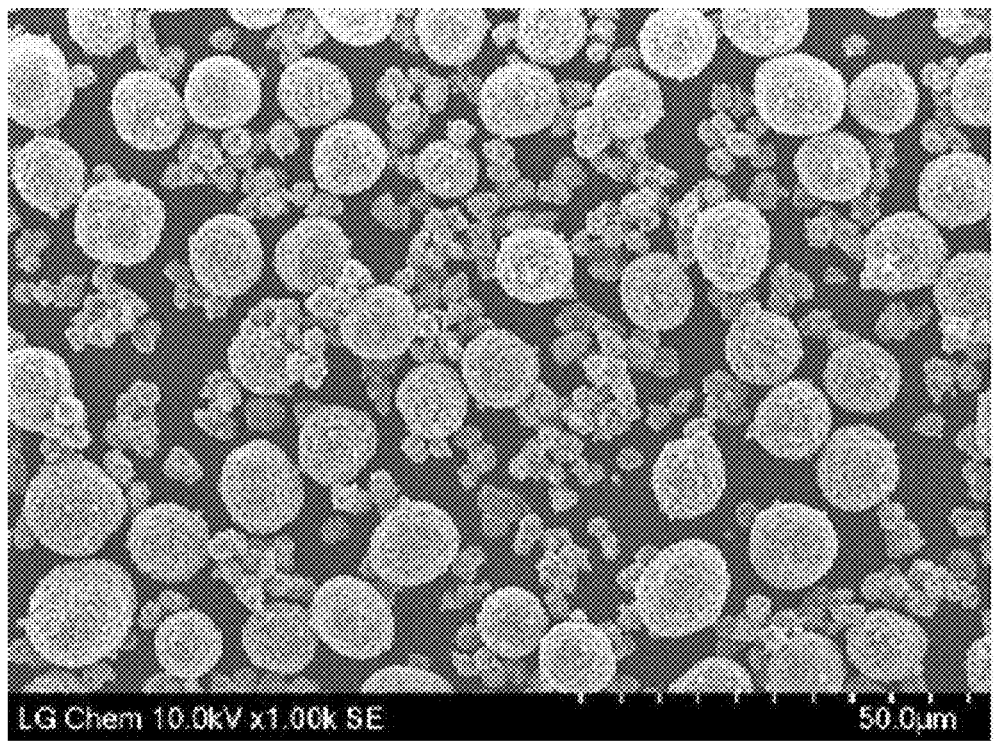
[FIG. 4]
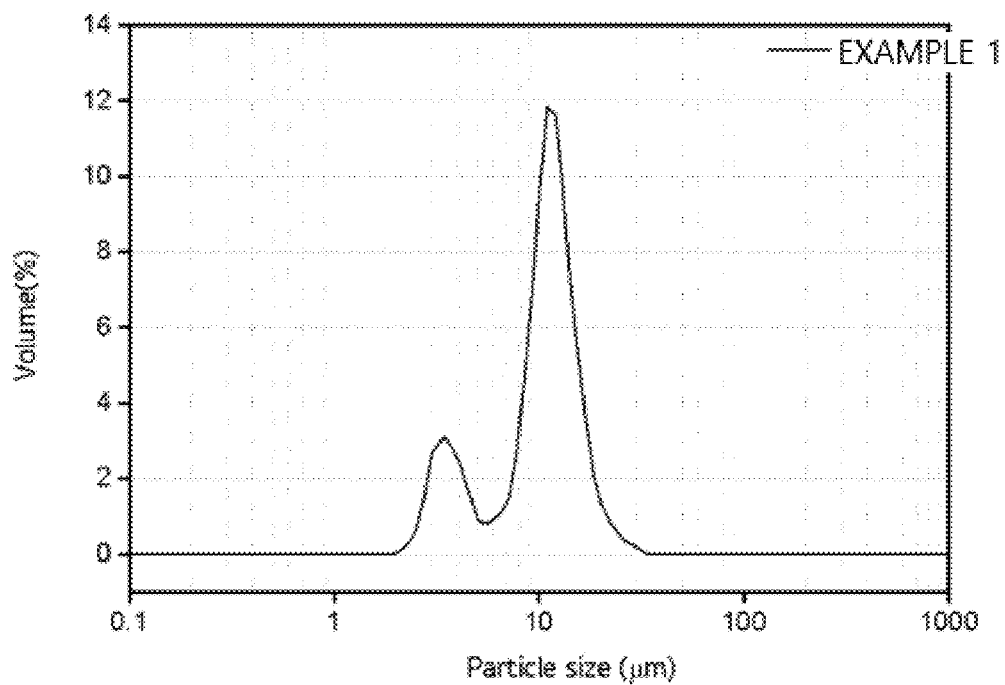

POSITIVE ELECTRODE ACTIVE MATERIAL PRECURSOR AND PREPARATION METHOD OF POSITIVE ELECTRODE ACTIVE MATERIAL PRECURSOR

CROSS-REFERENCE TO RELATED APPLICATION

This application is a national phase entry under 35 U.S.C. § 371 of International Application No. PCT/KR2021/006526, filed on May 26, 2021, which claims priority to and the benefit of Korean Patent Application No. 10-2020-0064875, filed on May 29, 2020, the disclosures of which are incorporated by reference herein.

TECHNICAL FIELD

The present invention relates to a positive electrode active material precursor and a preparation method of a positive electrode active material precursor.

BACKGROUND ART

As technology for mobile devices and electric vehicles is developing and the demand therefor increases, the demand for secondary batteries as a power source is rapidly increasing. Among secondary batteries, lithium secondary batteries having a high energy density, a high voltage, a long cycle lifespan, and a low self-discharge rate have been commercialized and widely used.

As the positive electrode active material for lithium secondary batteries, lithium-transition metal composite oxides have been used. Among them, lithium-cobalt composite oxides having a high operating voltage and excellent capacity characteristics, such as $LiCoO_2$ and the like, have been mainly used. However, $LiCoO_2$ has very poor thermal properties due to the destabilization of its crystal structure resulting from lithium deintercalation. Also, since $LiCoO_2$ is expensive, it has a limitation in mass use as a power source in the electric vehicle field and the like.

As a material for replacing $LiCoO_2$, lithium-manganese composite metal oxides ($LiMnO_2$, $LiMn_2O_4$, etc.), lithium-iron phosphate compounds ($LiFePO_4$, etc.), lithium-nickel composite metal oxides ($LiNiO_2$, etc.), and the like have been developed. Among them, lithium-nickel composite metal oxides, which have a high reversible capacity of about 200 mAh/g and thus facilitate the implementation of large-capacity batteries, have been actively researched and developed. However, $LiNiO_2$ has inferior thermal stability to $LiCoO_2$ and causes a battery to fracture and ignite because the positive electrode active material itself is decomposed when an internal short circuit occurs in a charged state due to pressure applied from the outside. Accordingly, as a method for improving the low thermal stability of $LiNiO_2$ while maintaining the excellent reversible capacity thereof, lithium-nickel-cobalt metal oxides, in which a part of the nickel (Ni) is substituted with cobalt (Co) and manganese (Mg) or aluminum (Al), have been developed.

However, the lithium-nickel-cobalt metal oxides have low capacity. To increase the capacity of the lithium-nickel-cobalt metal oxides, research has been conducted on increasing a nickel content or increasing packing density per unit volume of a positive electrode active material.

Conventionally, to prepare a high-density positive electrode active material having high packing density per unit volume, a precursor with small-sized particles and a precursor with large-sized particles are individually prepared, then mixed, and fired, or the prepared precursors are separated and recovered, mixed, and fired. However, this method requires a separation device and space for separating and recovering the individually prepared precursors with small-sized particles and large-sized particles and also requires an additional mixing process, and thus preparation costs and preparation time increase. Also, since an appropriate firing temperature varies depending on a particle size, firing uniformity is also unsatisfactory.

Therefore, there is a demand for the development of a method of preparing a positive electrode active material precursor, which is capable of reducing preparation costs and preparation time and optimized for joint firing.

DISCLOSURE

Technical Problem

The present invention is directed to providing a method of preparing a bimodal positive electrode active material precursor, which is capable of reducing preparation costs and preparation time and optimized for joint firing, and a bimodal positive electrode active material precursor optimized for joint firing.

Technical Solution

One aspect of the present invention provides a method of preparing a bimodal positive electrode active material precursor, which includes: a first step of preparing a first aqueous transition metal solution and a second aqueous transition metal solution whose metal element composition is different from that of the first aqueous transition metal solution; a second step of inputting a first reaction source material including the first aqueous transition metal solution, an ammonium-cation-containing complex-forming agent, and a basic aqueous solution into a reactor, performing a precipitation reaction at pH 12 or more to induce the nucleation of a first positive electrode active material precursor particle, and performing a precipitation reaction at less than pH 12 to induce the growth of the first positive electrode active material precursor particle; and a third step of inputting a second reaction source material including the second aqueous transition metal solution, an ammonium-cation-containing complex-forming agent, and a basic aqueous solution into the reactor containing the first positive electrode active material precursor particle, performing a precipitation reaction at pH 12 or more to induce the nucleation of a second positive electrode active material precursor particle, and performing a precipitation reaction at less than pH 12 to induce the simultaneous growth of the first positive electrode active material precursor particle and the second positive electrode active material precursor particle, thereby preparing a bimodal positive electrode active material precursor including the first positive electrode active material precursor particle and the second positive electrode active material precursor particle, which have mutually different average particle diameters ($D_{50}$), wherein at least one of the first aqueous transition metal solution and the second aqueous transition metal solution contains one or more doping elements selected from among Zr, B, W, Mo, Cr, Al, Ti, Mg, Ta, and Nb.

Another aspect of the present invention provides a bimodal positive electrode active material precursor which includes: a first positive electrode active material precursor particle having a core-shell structure; and a second positive electrode active material precursor particle having a smaller average particle diameter ($D_{50}$) than the first positive electrode active material precursor particle, wherein a core part of the first positive electrode active material precursor particle has a composition represented by the following Chemical Formula 1, a shell part of the first positive electrode active material precursor particle and the second positive electrode active material precursor particle have a composition represented by the following Chemical Formula 2, and the composition represented by Chemical Formula 1 is different from the composition represented by Chemical Formula 2.

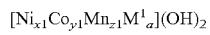  [Chemical Formula 1]

  [Chemical Formula 2]

in Chemical Formulas 1 and 2, $M^1$ and $M^2$ are each independently one or more selected from among Zr, B, W, Mo, Cr, Al, Ti, Mg, Ta, and Nb, $0.6 \leq x1 \leq 1.0$, $0 \leq y1 \leq 0.4$, $0 \leq z1 \leq 0.4$, $0 \leq a \leq 0.1$, and $x1+y1+z1+a=1$ are satisfied, $0.6 \leq x2 \leq 1.0$, $0 \leq y2 \leq 0.4$, $0 \leq z2 \leq 0.4$, $0 \leq b \leq 0.1$, and $x2+y2+z2+b=1$ are satisfied, and at least one of a or b exceeds 0.

Still another aspect of the present invention provides a positive electrode active material which is a product obtained by firing the bimodal positive electrode active material precursor according to the present invention and a lithium source material.

Yet another aspect of the present invention provides a positive electrode including the positive electrode active material according to the present invention and an electrochemical device including the positive electrode.

Advantageous Effects

According to the present invention, the synthesis of a bimodal positive electrode active material precursor having varying average particle diameters ($D_{50}$) using a single reactor is possible, and thus preparation costs and preparation time can be reduced.

In addition, according to the present invention, a difference in firing temperature between a first positive electrode active material precursor particle and a second positive electrode active material precursor particle, which have mutually different average particle diameters ($D_{50}$), is minimized using a doping element, and thus a bimodal positive electrode active material precursor having excellent firing uniformity can be prepared.

Additionally, since the bimodal positive electrode active material precursor according to the present invention is a bimodal positive electrode active material precursor doped with a doping element, only firing is performed rather than firing after additional mixing with a doping source material in the preparation of a positive electrode active material doped with a doping element, and thus a preparation process can be simplified.

Finally, according to the present invention, the composition of a bimodal positive electrode active material precursor can be easily adjusted, and thus a bimodal positive electrode active material precursor optimized for joint firing can be easily prepared.

DESCRIPTION OF DRAWINGS

FIG. 1 shows a scanning electron microscope (SEM) image of a bimodal positive electrode active material precursor prepared in Example 1 of the present invention.

FIG. 2 shows an SEM image of a bimodal positive electrode active material precursor prepared in Comparative Example 1 of the present invention.

FIG. 3 shows an SEM image of a bimodal positive electrode active material precursor prepared in Comparative Example 2 of the present invention.

FIG. 4 is a graph illustrating the particle size distribution of a bimodal positive electrode active material precursor prepared in Example 1 of the present invention.

MODES OF THE INVENTION

Hereinafter, the present invention will be described in more detail.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technological spirit of the present invention.

Throughout the specification, "tap density" means the apparent density of powder as obtained by vibrating a container under constant conditions when the container is filled with the powder and may be measured using a typical tap density tester, specifically, using TAS-2S (Logan Instruments), in accordance with ASTM B527-06.

Throughout the specification, an "average particle diameter ($D_{50}$)" may be defined as a particle diameter corresponding to 50% of the cumulative volume in a particle diameter distribution curve. The average particle diameter ($D_{50}$) may be measured, for example, using a laser diffraction method. For example, the average particle diameter ($D_{50}$) of a positive electrode active material may be measured by dispersing positive electrode active material particles in a dispersion medium, then introducing the resultant into a commercially available laser diffraction particle size analyzer (e.g., Microtrac MT 3000), radiating ultrasonic waves at a frequency of about 28 kHz and an output of 60 W, and determining an average particle diameter ($D_{50}$) corresponding to 50% of the cumulative volume in the analyzer.

Method of Preparing Bimodal Positive Electrode Active Material Precursor

First, a method of preparing a bimodal positive electrode active material precursor according to the present invention will be described.

A method of preparing a bimodal positive electrode active material precursor according to the present invention includes: a first step of preparing a first aqueous transition metal solution and a second aqueous transition metal solution whose metal element composition is different from that of the first aqueous transition metal solution; a second step of inputting a first reaction source material including the first aqueous transition metal solution, an ammonium-cation-containing complex-forming agent, and a basic aqueous solution into a reactor, performing a precipitation reaction at pH 12 or more to induce the nucleation of a first positive electrode active material precursor particle, and performing a precipitation reaction at less than pH 12 to induce the growth of the first positive electrode active material precursor particle; and a third step of inputting a second reaction source material including the second aqueous transition metal solution, an ammonium-cation-containing complex-forming agent, and a basic aqueous solution into the reactor containing the first positive electrode active material precursor particle, performing a precipitation reaction at pH 12 or more to induce the nucleation of a second positive electrode active material precursor particle, and performing a precipitation reaction at less than pH 12 to induce the simultaneous growth of the first positive electrode active material precursor particle and the second positive electrode active material precursor particle, thereby preparing a bimodal positive electrode active material precursor including the first positive electrode active material precursor particle and the second positive electrode active material precursor particle, which have mutually different average particle diameters ($D_{50}$), wherein at least one of the first aqueous transition metal solution and the second aqueous transition metal solution contains one or more doping elements selected from among Zr, B, W, Mo, Cr, Al, Ti, Mg, Ta, and Nb.

Hereinafter, each step of the present invention will be described in detail.

First Step

The first step is a step of preparing a first aqueous transition metal solution and a second aqueous transition metal solution whose metal element composition is different from that of the first aqueous transition metal solution. At least one of the first aqueous transition metal solution and the second aqueous transition metal solution contains one or more doping elements selected from among Zr, B, W, Mo, Cr, Al, Ti, Mg, Ta, and Nb.

In the specification, the metal element is meant to include both a transition metal element (e.g., nickel, manganese, cobalt, etc.) and a doping element that may be contained in the first aqueous transition metal solution and the second aqueous transition metal solution.

The first aqueous transition metal solution and the second aqueous transition metal solution may have mutually different metal element compositions.

For example, the first aqueous transition metal solution and the second aqueous transition metal solution may each independently include cations of one or more transition metals selected from among nickel, manganese, and cobalt and cations of one or more doping elements selected from among Zr, B, W, Mo, Cr, Al, Ti, Mg, Ta, and Nb. The first aqueous transition metal solution and the second aqueous transition metal solution may have different compositions of a transition metal ion and/or different compositions of a doping element ion.

Specifically, the first aqueous transition metal solution may contain nickel at 70 mol % to 90 mol %, cobalt at 0 mol % to 10 mol %, and manganese at 0 mol % to 20 mol % with respect to the total content of the metal elements, and the second aqueous transition metal solution may contain nickel at 60 mol % to 80 mol %, cobalt at 0 mol % to 20 mol %, manganese at 0 mol % to 20 mol %, and a doping element at 0.01 mol % to 0.5 mol % with respect to the total content of the metal elements. In this case, the prepared bimodal positive electrode active material precursor may exhibit excellent firing uniformity.

Meanwhile, the first aqueous transition metal solution may have a higher nickel ion concentration than the second aqueous transition metal solution. Also, the first aqueous transition metal solution may have a lower concentration of at least one transition metal ion of manganese and cobalt than the second aqueous transition metal solution.

The first aqueous transition metal solution and the second aqueous transition metal solution may each independently include an acetate, nitrate, sulfate, halide, sulfide, hydroxide, oxide, or oxyhydroxide of the transition metals, and the above-listed compounds are not particularly limited as long as they are able to be dissolved in water.

For example, the nickel source material may be a nickel-containing acetate, nitrate, sulfate, halide, sulfide, hydroxide, oxide, or oxyhydroxide and may specifically be $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a nickel salt of a fatty acid, a nickel halide, or a combination thereof, but the present invention is not limited thereto.

The cobalt source material may be a cobalt-containing acetate, nitrate, sulfate, halide, sulfide, hydroxide, oxide, or oxyhydroxide and may specifically be $Co(OH)_2$, $CoOOH$, $Co(OCOCH_3)_2 \cdot 4H_2O$, $Co(NO_3)_2 \cdot 6H_2O$, $CoSO_4$, $Co(SO_4)_2 \cdot 7H_2O$, or a combination thereof, but the present invention is not limited thereto.

The manganese source material may be, for example, a manganese-containing acetate, nitrate, sulfate, halide, sulfide, hydroxide, oxide, or oxyhydroxide or a combination thereof and may specifically be: a manganese oxide such as $Mn_2O_3$, $MnO_2$, $Mn_3O_4$, and the like; a manganese salt such as $MnCO_3$, $Mn(NO_3)_2$, $MnSO_4$, manganese acetate, manganese dicarboxylate, manganese citrate, a manganese salt of a fatty acid; manganese oxyhydroxide; manganese chloride; or a combination thereof, but the present invention is not limited thereto.

The first aqueous transition metal solution and/or the second aqueous transition metal solution may be prepared by adding the nickel-containing source material, cobalt-containing source material, and manganese-containing source material to a solvent, specifically, water or a solvent mixture of water and an organic solvent (e.g., alcohol, etc.) uniformly mixable with water, or by mixing an aqueous nickel-containing source material solution, an aqueous cobalt-containing source material solution, and an aqueous manganese-containing source material solution.

The concentration of the nickel source material, cobalt source material, and manganese source material included in the first aqueous transition metal solution and/or the second aqueous transition metal solution may be adjusted to adjust the composition of the finally prepared positive electrode active material precursor. For example, the concentration of the source materials may be adjusted to prepare a positive electrode active material precursor having a nickel (Ni) content accounting for 60 mol % or more of the total metal. In this case, the inclusion of a high nickel content (Ni-rich) may allow high capacity characteristics to be achieved.

According to the present invention, at least one of the first aqueous transition metal solution and the second aqueous transition metal solution may contain one or more doping elements selected from among Zr, B, W, Mo, Cr, Al, Ti, Mg, Ta, and Nb. Specifically, the second aqueous transition metal solution may contain the doping element. According to the present invention, a difference in firing temperature between a first positive electrode active material precursor particle and a second positive electrode active material precursor particle, which have mutually different average particle diameters ($D_{50}$), is minimized using the doping element, and thus a positive electrode active material precursor having excellent firing uniformity may be prepared.

Meanwhile, when a doping element is contained in both the first aqueous transition metal solution and the second aqueous transition metal solution, at least one of the type and content of a doping element contained in each aqueous solution may vary. In this case, the composition of the first positive electrode active material precursor particle and the composition of the second positive electrode active material precursor particle are adjusted differently, and accordingly, firing non-uniformity resulting from an average particle diameter ($D_{50}$) difference may be compensated, allowing the firing uniformity of a bimodal positive electrode active material precursor to be enhanced.

Since the bimodal positive electrode active material precursor according to the present invention is a bimodal positive electrode active material precursor doped with a doping element, only firing is performed rather than firing after additional mixing with a doping source material in the preparation of a positive electrode active material doped with a doping element, and thus a preparation process may be simplified.

According to the present invention, the doping element may be one or more selected from among Zr, Al, B, and W. In this case, the doping element is substituted inside a transition metal crystal to enhance crystallinity, and thus the firing uniformity of the prepared bimodal positive electrode active material precursor may be improved.

According to the present invention, the doping element may be contained in an amount of 0.01 mol % to 0.5 mol % with respect to the total content of the metal elements contained in the first aqueous transition metal solution or the second aqueous transition metal solution. Specifically, the doping element may be contained in an amount of 0.1 mol % to 0.3 mol % or 0.15 mol % to 0.25 mol % with respect to the total content of the metal elements contained in the first aqueous transition metal solution or the second aqueous transition metal solution. When the content of the doping element falls within the above-described range, a precipitation phase is not generated, and the doping element is substituted inside a transition metal crystal to enhance crystallinity, and thus the firing uniformity of the prepared bimodal positive electrode active material precursor may be improved.

One or more doping elements selected from among Zr, B, W, Mo, Cr, Al, Ti, Mg, Ta, and Nb may be contained when the doping element-containing source material is added in the preparation of the first aqueous transition metal solution and/or the second aqueous transition metal solution.

The doping element-containing source material may be an acetate, nitrate, sulfate, halide, sulfide, hydroxide, oxide, or oxyhydroxide, which contains the doping element. For example, when the doping element is Zr, $ZrSO_4$ or the like may be used.

When the doping element-containing source material is added in the preparation of the first aqueous transition metal solution and/or the second aqueous transition metal solution while adjusting the type and concentration thereof, the compositions of the first positive electrode active material precursor particle and the second positive electrode active material precursor particle may be adjusted so that the finally prepared positive electrode active material precursor exhibits excellent firing uniformity.

As described above, according to the present invention, the composition of a bimodal positive electrode active material precursor can be easily adjusted, and accordingly, a positive electrode active material precursor optimized for joint firing can be easily prepared.

Second Step

The second step is a step of inputting a first reaction source material including the first aqueous transition metal solution, an ammonium-cation-containing complex-forming agent, and a basic aqueous solution into a reactor, performing a precipitation reaction at pH 12 or more to induce the nucleation of a first positive electrode active material precursor particle, and performing a precipitation reaction at less than pH 12 to induce the growth of the first positive electrode active material precursor particle.

The ammonium-ion-containing solution may include one or more selected from among $NH_4OH$, $(NH_4)_2SO_4$, $NH_4NO_3$, $NH_4Cl$, $CH_3COONH_4$, and $NH_4CO_3$. In this case, water or a mixture of water and an organic solvent (specifically, alcohol, etc.) uniformly mixable with water may be used as a solvent.

The basic aqueous solution may include one or more selected from among NaOH, KOH, and $Ca(OH)_2$, and water or a mixture of water and an organic solvent (specifically, alcohol, etc.) uniformly mixable with water may be used as a solvent. In this case, the basic aqueous solution may have a concentration of 2 M to 10 M, and preferably, 2.5 M to 3.5 M. When the concentration of the basic aqueous solution is 2 M to 10 M, uniformly sized precursor particles can be formed, the time required for the precursor particles to be formed can be shortened, and yield can also be high.

The second step may be performed by inputting deionized water into a reactor, purging the reactor with inert gas to remove oxygen dissolved in the water, creating a non-oxidizing atmosphere inside the reactor, inputting an ammonium-cation-containing complex-forming agent and a basic aqueous solution until they fill a certain volume of the reactor, and adjusting the pH inside the reactor.

The second step is a step of inputting the first aqueous transition metal solution to induce the nucleation of a first positive electrode active material precursor particle and then the growth of the first positive electrode active material precursor particle. Meanwhile, since the pH value of a reaction solution is changed as the nucleation of a first positive electrode active material precursor particle or the growth of the first positive electrode active material precursor particle occurs, a basic aqueous solution and an ammonium-cation-containing complex-forming agent may be continuously input together with the input of the first aqueous transition metal solution so as to maintain and adjust a pH condition.

The nucleation of a first positive electrode active material precursor particle may be performed at pH 12 or more, specifically, at pH 12 to pH 13. More specifically, the nucleation may be performed at pH 12 to pH 12.5. When the pH falls within the above-described range, only the nucleation of particles occurs, and the growth of particles hardly occurs.

The growth of the first positive electrode active material precursor particle may be performed at less than pH 12, specifically, at pH 10 or more and less than pH 12. More specifically, the growth may be performed at pH 11 or more and less than pH 12. When the pH falls within the above-described range, additional nucleation of particles hardly occurs, and the growth of previously formed particles preferentially occurs.

Meanwhile, the reactor according to the present invention may include a filter. When the reactor is full, the reaction source material may be input while discharging a reaction mother liquor, whose reaction is completed, to the outside of the reactor through the filter included in the reactor, thereby preparing a bimodal positive electrode active material precursor. In this case, the productivity of a bimodal positive electrode active material precursor may be enhanced.

The reactor may allow only a reaction mother liquor, whose reaction is completed, to be effectively discharged to the outside of the reactor without halting the input of the reaction source material when the reactor is full.

As the filter, any filter that is able to easily filter a reaction mother liquor may be used without particular limitation. For example, one filter or a plurality of 2 or more filters are installed inside and/or outside the reactor, and thus only a reaction mother liquor, whose reaction is completed inside the reactor, may be discharged, but the present invention is not limited thereto.

In this case, the flow rate of a reaction mother liquor discharged to the outside when the reactor is full may be the same as the flow rate of the input reaction source material, but the present invention is not limited thereto.

Third Step

The third step is a step of inputting a second reaction source material including the second aqueous transition metal solution, an ammonium-cation-containing complex-forming agent, and a basic aqueous solution into the reactor containing the first positive electrode active material precursor particle, performing a precipitation reaction at pH 12 or more to induce the nucleation of a second positive electrode active material precursor particle, and performing a precipitation reaction at less than pH 12 to induce the simultaneous growth of the first positive electrode active material precursor particle and the second positive electrode active material precursor particle, thereby preparing a bimodal positive electrode active material precursor including the first positive electrode active material precursor particle and the second positive electrode active material precursor particle, which have mutually different average particle diameters ($D_{50}$).

According to the present invention, the synthesis of a bimodal positive electrode active material precursor having varying average particle diameters ($D_{50}$) and varying compositions using a single reactor is possible, and thus preparation costs and preparation time may be reduced. That is, the method of preparing a bimodal positive electrode active material precursor according to the present invention hardly requires a separation device and space compared to a conventional method in which a precursor with small-sized particles and a precursor with large-sized particles are individually prepared in different reactors, separated, recovered, and mixed to prepare a bimodal positive electrode active material precursor, and thus preparation costs and preparation time may be reduced.

Meanwhile, when the third step proceeds while the first aqueous transition metal solution is not changed to the second aqueous transition metal solution, additional nucleation of the first positive electrode active material precursor particle in the reactor occurs as a pH is changed to 12 or more. That is, the preparation of a positive electrode active material precursor having varying average particle diameters ($D_{50}$) in the same reactor is possible, but the positive electrode active material precursor thus prepared is formed to have the same composition. In this case, when a positive electrode active material is prepared by mixing positive electrode active material precursor particles with a lithium source material and firing the mixture, positive electrode active material precursor particles with a large average particle diameter ($D_{50}$) are partially unfired, and positive electrode active material precursor particles with a small average particle diameter ($D_{50}$) are over-fired, leading to poor firing uniformity.

However, firing non-uniformity resulting from an average particle diameter ($D_{50}$) difference may be compensated by adjusting the metal element composition of the first aqueous transition metal solution and the second aqueous transition metal solution and using a doping element in the preparation of a positive electrode active material precursor as in the present invention, and accordingly, firing uniformity may be enhanced.

The third step is a step of inputting the second aqueous transition metal solution into the reactor containing the first positive electrode active material precursor particle to induce the nucleation of a second positive electrode active material precursor particle and then the simultaneous growth of the first positive electrode active material precursor particle and the second positive electrode active material precursor particle. Meanwhile, since the pH value of a reaction solution is changed as the nucleation of a second positive electrode active material precursor particle or the growth of the second positive electrode active material precursor particle occurs, a basic aqueous solution and an ammonium-cation-containing complex-forming agent may be continuously input together with the input of the second aqueous transition metal solution so as to maintain and adjust a pH condition.

The nucleation of a second positive electrode active material precursor particle may be performed at pH 12 or more, specifically, at pH 12 to pH 13. More specifically, the nucleation may be performed at pH 12.5 to pH 13. When the pH falls within the above-described range, only the nucleation of particles occurs, and the growth of particles hardly occurs.

The growth of the second positive electrode active material precursor particle may be performed at less than pH 12, specifically, at pH 10 or more and less than pH 12. More specifically, the growth may be performed at pH 11 or more and less than pH 12. When the pH falls within the above-described range, additional nucleation of particles hardly occurs, and the growth of previously formed particles preferentially occurs. Accordingly, the growth of the first positive electrode active material precursor particle present in the reactor as well as the growth of the second positive electrode active material precursor particle occurs.

That is, the first positive electrode active material precursor particle may have a core-shell structure including a core part having the same metal element composition as that of the first aqueous transition metal solution due to the second step and a shell part having the same metal element composition as that of the second aqueous transition metal solution due to the third step.

In this case, the volume occupied by the core part and the shell part may be adjusted by adjusting the reaction time of the second step and the third step.

Meanwhile, it is preferable that the first positive electrode active material precursor particle and the second positive electrode active material precursor particle are formed in a weight ratio of 9:1 to 6:4, and preferably, 8:2 to 7:3, in terms of improvement of packing density per unit volume, and the reaction time of the second step and the third step may be adjusted to adjust a ratio of the first positive electrode active material precursor particle and the second positive electrode active material precursor particle. For example, when the proportion of the second positive electrode active material precursor particle is below the above-described range, a change in the composition of the first positive electrode active material precursor particle is insignificant, and the time for the second positive electrode active material precursor to grow is insufficient, and thus an average particle diameter may be decreased, leading to a limitation in improving firing non-uniformity. On the other hand, when the proportion of the second positive electrode active material precursor particle is above the above-described range, a packing density improvement effect caused by a bimodal particle size distribution may be insignificant.

In addition, the reaction time of the second step and the third step may be adjusted to adjust the average particle diameter ($D_{50}$) of the first positive electrode active material precursor particle and the second positive electrode active material precursor particle.

For example, the first positive electrode active material precursor particle may have an average particle diameter ($D_{50}$) of 8 μm to 15 μm, and preferably, 10 μm to 13 μm. When the average particle diameter ($D_{50}$) of the first positive electrode active material precursor particle falls within the above-described range, the tap density of the first positive electrode active material precursor can increase.

For example, the second positive electrode active material precursor particle may have an average particle diameter ($D_{50}$) of 1 μm to 8 μm, preferably 2 μm to 6 μm, and most preferably 3 μm to 5 μm. When the average particle diameter ($D_{50}$) of the second positive electrode active material precursor particle falls within the above-described range, tap density can be improved in mixing with the first positive electrode active material precursor particle having an average particle diameter within the above-described range.

When the bimodal precursor according to the present invention includes the first positive electrode active material precursor particle and the second positive electrode active material precursor particle which have average particle diameters ($D_{50}$) within the above-described ranges, the second positive electrode active material precursor particle having a relatively small average particle diameter ($D_{50}$) is positioned in the empty space of the first positive electrode active material precursor particle, and thus packing density per unit volume can further increase.

Next, a process of separating the obtained bimodal precursor, followed by rinsing and drying may be further performed.

The rinsing process may be performed, for example, by inputting a lithium transition metal oxide into ultrapure water and performing stirring. In this case, the rinsing temperature may be 20° C. or less, and preferably, 10° C. to 20° C., and the rinsing time may be about 10 minutes to 1 hour.

The drying process is intended to dry the rinsing solution, and any method that does not cause a chemical change to the obtained positive electrode active material precursor particle and allows the solution to be dried may be used without particular limitation. For example, the drying process may be performed using spray drying, drying using a rotary evaporator, vacuum drying, or air drying.

Bimodal Positive Electrode Active Material Precursor

Next, a bimodal positive electrode active material precursor according to the present invention will be described.

A bimodal positive electrode active material precursor according to the present invention includes: a first positive electrode active material precursor particle having a core-shell structure; and a second positive electrode active material precursor particle having a smaller average particle diameter ($D_{50}$) than the first positive electrode active material precursor particle, wherein a core part of the first positive electrode active material precursor particle has a composition represented by the following Chemical Formula 1, a shell part of the first positive electrode active material precursor particle and the second positive electrode active material precursor particle have a composition represented by the following Chemical Formula 2, and the composition represented by Chemical Formula 1 is different from the composition represented by Chemical Formula 2.

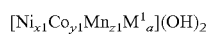  [Chemical Formula 1]

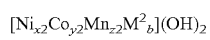  [Chemical Formula 2]

In Chemical Formulas 1 and 2, $M^1$ and $M^2$ are each independently one or more selected from among Zr, B, W, Mo, Cr, Al, Ti, Mg, Ta, and Nb, $0.6 \leq x1 \leq 1.0$, $0 \leq y1 \leq 0.4$, $0 \leq z1 \leq 0.4$, $0 \leq a \leq 0.1$, and $x1+y1+z1+a=1$ are satisfied, $0.6 \leq x2 \leq 1.0$, $0 \leq y2 \leq 0.4$, $0 \leq z2 \leq 0.4$, $0 \leq b \leq 0.1$, and $x2+y2+z2+b=1$ are satisfied, and at least one of a or b exceeds 0.

The bimodal positive electrode active material precursor may be prepared by the above-described method of preparing a positive electrode active material precursor.

The bimodal positive electrode active material precursor according to the present invention may exhibit excellent firing uniformity by minimizing a difference in firing temperature by varying the composition of the first positive electrode active material precursor particle and the second positive electrode active material precursor particle, which have mutually different average particle diameters ($D_{50}$), using a doping element. In addition, since the bimodal positive electrode active material precursor according to the present invention is a bimodal positive electrode active material precursor doped with a doping element, only firing is performed rather than firing after additional mixing with a doping source material in the preparation of a positive electrode active material doped with a doping element, and thus a process of preparing an active material may be simplified.

According to the present invention, $M^1$ and $M^2$ in Chemical Formulas 1 and 2 may each independently be one or more selected from among Zr, Al, B, and W. In this case, the doping element is substituted inside a transition metal crystal to enhance crystallinity, and thus the firing uniformity of the prepared bimodal positive electrode active material precursor may be improved.

According to the present invention, a in Chemical Formula 1 may be 0, and b in Chemical Formula 2 may satisfy $0.0001 \leq b \leq 0.05$. Specifically, Chemical Formula 2 may satisfy $0.01 \leq b \leq 0.03$ or $0.015 \leq b \leq 0.025$. In this case, a precipitation phase is not generated, and the doping element is substituted inside a transition metal crystal to enhance crystallinity, and thus the firing uniformity of the prepared bimodal positive electrode active material precursor may be improved.

According to the present invention, the first positive electrode active material precursor particle may have an average particle diameter ($D_{50}$) of 8 μm to 15 μm, and the second positive electrode active material precursor particle may have an average particle diameter ($D_{50}$) of 1 μm or more and less than 8 μm.

For example, the first positive electrode active material precursor particle may have an average particle diameter ($D_{50}$) of 8 μm to 15 μm, and preferably, 10 μm to 13 μm. When the average particle diameter ($D_{50}$) of the first positive electrode active material precursor particle satisfies the above-described range, the tap density of the first positive electrode active material precursor can increase.

For example, the second positive electrode active material precursor particle may have an average particle diameter ($D_{50}$) of 1 μm to 8 μm, preferably 2 μm to 6 μm, and most preferably 3 μm to 5 μm. When the average particle diameter ($D_{50}$) of the second positive electrode active material precursor particle satisfies the above-described range, tap density can be improved in mixing with the first positive electrode active material precursor having an average particle diameter within the above-described range.

According to the present invention, the bimodal positive electrode active material precursor may have a tap density of 2.0 g/cc to 2.5 g/cc. The tap density of the bimodal positive electrode active material precursor may specifically be 2.2 g/cc to 2.5 g/cc, and more specifically, 2.2 g/cc to 2.4 g/cc. When the tap density of the bimodal positive electrode active material precursor falls within the above-described range, when the bimodal positive electrode active material precursor is mixed with a lithium source material and then fired, heat can be uniformly transferred, and a packing amount of the positive electrode active material precursor can increase, resulting in increased productivity.

According to the present invention, a pellet density may be 2.0 g/cc to 3.0 g/cc as measured after the bimodal positive electrode active material precursor is compressed at a roll density of 1.0 kgf/cm$^2$ to 5.0 kgf/cm$^2$ to prepare a pellet form. The pellet density may specifically be 2.5 g/cc to 3.0 g/cc, and more specifically, 2.9 g/cc to 3.0 g/cc.

Positive Electrode Active Material

Next, a positive electrode active material, which is a product obtained by firing the bimodal positive electrode active material precursor according to the present invention and a lithium source material, will be described.

The positive electrode active material may be prepared by mixing the bimodal positive electrode active material precursor of the present invention with a lithium source material and firing the mixture.

Examples of the lithium source material include lithium-containing carbonates (e.g., lithium carbonate, etc.), lithium-containing hydrates (e.g., lithium hydroxide hydrate (LiOH.H$_2$O), etc.), lithium-containing hydroxides (e.g., lithium hydroxide, etc.), lithium-containing nitrates (e.g., lithium nitrate (LiNO$_3$), etc.), lithium-containing chlorides (e.g., lithium chloride (LiCl), etc.), and the like, which may be used alone or in combination of two or more thereof.

Meanwhile, the mixing of the positive electrode active material precursor and the lithium source material may be performed through solid phase mixing, and the mixing ratio of the positive electrode active material precursor and the lithium source material may be determined within the range satisfying the atomic fraction of each component in the finally prepared positive electrode active material. For example, the positive electrode active material precursor and the lithium source material may be mixed in an amount such that a molar ratio of transition metal:Li is 1:0.9 to 1:1.2, specifically, 1:0.98 to 1:1.1. When the precursor and the lithium source material are mixed within the above-described range, a positive electrode active material exhibiting excellent capacity characteristics can be prepared.

The firing may be performed at 600° C. to 1000° C., specifically, 700° C. to 900° C., for 5 hours to 30 hours, specifically, 8 hours to 15 hours, but the present invention is not limited thereto.

Positive Electrode

Next, a positive electrode including the above-described positive electrode active material of the present invention will be described.

The positive electrode includes a positive electrode current collector and a positive electrode active material layer formed on the positive electrode current collector, and the positive electrode active material layer includes the positive electrode active material according to the present invention.

Since the positive electrode active material has been described above, a detailed description thereof will be omitted, and only the remaining components will be described in detail.

The positive electrode current collector may contain a metal with high conductivity and is not particularly limited as long as it is easily adhered to a positive electrode active material layer and has no reactivity within the voltage range of a battery. For example, stainless steel, aluminum, nickel, titanium, firing carbon, aluminum or stainless steel whose surface has been treated with carbon, nickel, titanium, silver, or the like, or the like may be used as the positive electrode current collector. In addition, the positive electrode current collector may typically have a thickness of 3 μm to 500 μm and have fine irregularities formed on the surface thereof to increase the adhesion of a positive electrode active material. Additionally, the positive electrode current collector may be used in any of various forms such as a film, a sheet, a foil, a net, a porous material, a foam, a non-woven fabric, and the like.

The positive electrode active material layer may optionally include a conductive material and a binder, as necessary, in addition to the positive electrode active material.

In this case, the positive electrode active material may be included in an amount of 80 wt % to 99 wt %, and more specifically, 85 wt % to 98.5 wt %, with respect to the total weight of the positive electrode active material layer. Within the above-described range, excellent capacity characteristics can be exhibited.

The conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as carbon black, acetylene black, Ketjen black, channel black, furnace black, lamp black, thermal black, carbon fiber, or the like; a metal powder or metal fiber containing copper, nickel, aluminum, silver, or the like; a conductive tube such as carbon nanotubes or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof. The conductive material may be included in an amount of 0.1 wt % to 15 wt % with respect to the total weight of the positive electrode active material layer.

The binder serves to improve cohesion between positive electrode active material particles and adhesion between the positive electrode active material and the current collector. Specific examples of the binder include polyvinylidene fluoride (PVDF), a polyvinylidene fluoride-hexafluoropropylene copolymer (PVDF-co-HFP), polyvinyl alcohol, polyacrylonitrile, polymethyl methacrylate, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluoro-rubber, polyacrylic acid, a polymer whose hydrogen is substituted with Li, Na, or Ca, and various copolymers thereof, which may be used alone or in combination of two or more thereof. The binder may be included in an amount of 0.1 wt % to 15 wt % with respect to the total weight of the positive electrode active material layer.

The positive electrode may be manufactured by a conventional method of manufacturing a positive electrode, except that the above-described positive electrode active material is used. Specifically, the positive electrode may be manufactured by applying a composition for forming a positive electrode active material layer, which is prepared by dissolving or dispersing the above-described positive electrode active material and, optionally, a binder, a conductive material, and a dispersant in a solvent, onto a positive electrode current collector, followed by drying and roll pressing.

The solvent may be a solvent generally used in the art, and examples of the solvent include dimethyl sulfoxide (DMSO), isopropyl alcohol, N-methyl pyrrolidone (NMP), dimethylformamide (DMF), acetone, water, and the like, which may be used alone or in combination of two or more thereof. The solvent is used in an amount sufficient to dissolve or disperse the positive electrode active material, the conductive material, the binder, and the dispersant and to have a viscosity capable of achieving excellent thickness uniformity upon subsequent application for manufacturing the positive electrode in consideration of a thickness of an applied slurry and a manufacturing yield.

According to another method, the positive electrode may be manufactured by laminating, on a positive electrode current collector, a film obtained by casting the composition for forming a positive electrode active material layer on a separate support and removing it from the support.

Electrochemical Device

Next, an electrochemical device including the above-described positive electrode will be described.

The electrochemical device may specifically be a battery, a capacitor, or the like, and more specifically, a lithium secondary battery.

The lithium secondary battery specifically includes a positive electrode, a negative electrode disposed to face the positive electrode, a separator interposed between the positive electrode and the negative electrode, and an electrolyte. Since the positive electrode is the same as described above, the detailed description thereof will be omitted, and only the remaining components will be described in detail.

In addition, the lithium secondary battery may optionally further include: a battery container which accommodates an electrode assembly including the positive electrode, the negative electrode, and the separator; and a sealing member which seals the battery container.

In the lithium secondary battery, the negative electrode includes a negative electrode current collector and a negative electrode active material layer formed on the negative electrode current collector.

The negative electrode current collector is not particularly limited as long as it does not cause a chemical change in the battery and has high conductivity. For example, copper, stainless steel, aluminum, nickel, titanium, calcined carbon, copper or stainless steel whose surface has been treated with carbon, nickel, titanium, silver, or the like, an aluminum-cadmium alloy, or the like may be used as the negative electrode current collector. In addition, the negative electrode current collector may typically have a thickness of 3 μm to 500 μm and have fine irregularities formed on the surface thereof to increase the adhesion of a negative electrode active material like the positive electrode current collector. Additionally, the negative electrode current collector may be used in any of various forms such as a film, a sheet, a foil, a net, a porous material, a foam, a non-woven fabric, and the like.

The negative electrode active material layer includes a negative electrode active material and, optionally, a binder and a conductive material.

As the negative electrode active material, a compound that enables the reversible intercalation and deintercalation of lithium may be used. Specific examples of the negative electrode active material include: a carbonaceous material such as artificial graphite, natural graphite, graphitized carbon fiber, amorphous carbon, or the like; a metallic compound capable of alloying with lithium, such as Si, Al, Sn, Pb, Zn, Bi, In, Mg, Ga, Cd, a Si alloy, a Sn alloy, an Al alloy, or the like; a metal oxide capable of doping and dedoping lithium, such as $SiO_\beta$ ($0<\beta<2$), $SnO_2$, vanadium oxide, or lithium vanadium oxide; and a composite including the metallic compound and the carbonaceous material, such as a Si—C composite or a Sn—C composite, which may be used alone or in combination of two or more thereof. In addition, a lithium metal thin film may be used as the negative electrode active material. Additionally, as a carbon material, both low-crystallinity carbon and high-crystallinity carbon may be used. Representative examples of the low-crystallinity carbon include soft carbon and hard carbon, and representative examples of the high-crystallinity carbon include amorphous, platy, flaky, spherical or fibrous natural graphite or artificial graphite, Kish graphite, pyrolytic carbon, mesophase pitch-based carbon fiber, meso-carbon microbeads, mesophase pitches, and high-temperature calcined carbon such as petroleum or coal tar pitch-derived cokes, and the like.

The negative electrode active material may be included in an amount of 80 wt % to 99 wt % with respect to the total weight of the negative electrode active material layer.

The binder serves to assist bonding between the conductive material, the active material, and the current collector and is typically included in an amount of 0.1 wt % to 10 wt % with respect to the total weight of the negative electrode active material layer. Examples of the binder include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber, nitrile butadiene rubber, fluorine rubber, and various copolymers thereof.

The conductive material is a component for improving the conductivity of the negative electrode active material and may be included in an amount of 10 wt % or less, and specifically, 5 wt % or less with respect to the total weight of the negative electrode active material layer. Such a conductive material is not particularly limited as long as it does not cause a chemical change in the battery and has conductivity. For example, graphite such as natural graphite, artificial graphite, or the like; carbon black such as acetylene black, Ketjen black, channel black, furnace black, lamp black, thermal black, or the like; a conductive fiber such as a carbon fiber, a metal fiber, or the like; a metal powder containing carbon fluoride, aluminum, nickel, or the like; a conductive whisker such as zinc oxide, potassium titanate, or the like; a conductive metal oxide such as titanium oxide or the like; or a conductive material such as a polyphenylene derivative or the like may be used.

The negative electrode active material layer may be formed by applying a composition for forming a negative electrode active material layer, which is prepared by dissolving or dispersing a negative electrode active material and, optionally, a binder and a conductive material in a solvent, onto a negative electrode current collector and drying the same, or by laminating, on a negative electrode current collector, a film obtained by casting the composition for forming a negative electrode active material layer on a separate support and removing it from the support.

Meanwhile, in the lithium secondary battery, the separator serves to separate the negative electrode and the positive electrode and provide a passage for lithium ion migration. As the separator, any separator that is typically used in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. In addition, a typical porous non-woven fabric, for example, a non-woven fabric made of high-melting-point glass fiber, polyethylene terephthalate fiber, or the like may be used. Also, to ensure heat resistance or mechanical strength, a coated separator which includes a ceramic component or polymer material and is optionally in a single-layer or multi-layer structure may be used.

In addition, as the electrolyte, an organic liquid electrolyte, an inorganic liquid electrolyte, a solid polymer electrolyte, a gel-type polymer electrolyte, an inorganic solid electrolyte, a molten-type inorganic electrolyte, or the like, which is usable in the manufacture of a lithium secondary battery, may be used, but the present invention is not limited thereto.

Specifically, the electrolyte may include an organic solvent and a lithium salt.

As the organic solvent, any solvent that may function as a medium through which ions involved in an electrochemical reaction of the battery can migrate may be used without particular limitation. Specifically, the organic solvent may be: an ester-based solvent such as methyl acetate, ethyl acetate, γ-butyrolactone, F-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte performance may be exhibited.

As the lithium salt, any compound that may provide lithium ions used in a lithium secondary battery may be used without particular limitation. Specifically, at least one selected from the group consisting of $F^-$, $Cl^-$, $Br^-$, $I^-$, $NO_3^-$, $N(CN)_2^-$, $BF_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt, and $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used as the lithium salt. The lithium salt is preferably used at a concentration of 0.1 M to 2.0 M. When the concentration of the lithium salt falls within the above-described range, the electrolyte has appropriate levels of conductivity and viscosity, and thus excellent electrolyte performance can be exhibited, and lithium ions can effectively migrate.

In addition to the above-described electrolyte components, the electrolyte may further include at least one additive selected from a haloalkylene carbonate-based compound such as difluoroethylene carbonate and the like, pyridine, triethylphosphite, triethanolamine, cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like for the purpose of improving the lifetime characteristics of the battery, suppressing a reduction in battery capacity, improving the discharge capacity of the battery, or the like. In this case, the additive may be included in an amount of 0.1 to 5 wt % with respect to the total weight of the electrolyte.

Since the lithium secondary battery including the positive electrode active material according to the present invention stably exhibits excellent discharge capacity, output characteristics, and lifetime characteristics as described above, it is useful in the field of portable devices such as mobile phones, notebook computers, digital cameras, and the like and electric vehicles such as hybrid electric vehicles (HEVs) and the like.

Accordingly, a battery module including the lithium secondary battery as a unit cell and a battery pack including the battery module may also be provided.

The battery module or battery pack may be used as a power source for one or more medium-to-large-sized devices selected from a power tool; electric vehicles (EVs), hybrid electric vehicles, and plug-in hybrid electric vehicles (PHEVs); and a system for storing electric power.

The type of lithium secondary battery may be, but is not particularly limited to, a cylindrical type using a can, a prismatic type, a pouch type, a coin type, or the like.

The lithium secondary battery may be used not only in a battery cell used as a power source of a small device but also as a unit battery in medium-to-large-sized battery modules including a plurality of battery cells.

Examples of the medium-to-large-sized device include electric vehicles, hybrid electric vehicles, plug-in hybrid electric vehicles, a system for storing electric power, and the like, but the present invention is not limited thereto.

Hereinafter, the present invention will be described in detail with reference to examples. However, examples of the present invention may be modified in several different forms, and the scope of the present invention is not limited to the examples to be described below. The examples of the present invention are provided so that this disclosure will be thorough and complete, and will fully convey the concept of examples to those skilled in the art.

EXAMPLES AND COMPARATIVE EXAMPLES

Example 1

$NiSO_4$, $CoSO_4$, and $MnSO_4$ were mixed in water in amounts such that a molar ratio of nickel:cobalt:manganese was 73:7:20 to prepare a first aqueous transition metal solution with a concentration of 2.4 M. Also, $NiSO_4$, $CoSO_4$, and $MnSO_4$ were mixed in water in amounts such that a molar ratio of nickel:cobalt:manganese was 68:12:20, and $ZrSO_4$ was also mixed in an amount of 0.2 mol % with respect to the total content of the metal elements included in a second aqueous transition metal solution to prepare a second aqueous transition metal solution with a concentration of 2.4 M.

Each of a container containing the first aqueous transition metal solution, a container containing the second aqueous transition metal solution, a container containing a 25 wt % NaOH aqueous solution, and a container containing a 9 wt % $NH_4OH$ aqueous solution was connected to a reactor (70 L).

Subsequently, 20 L of deionized water was input into the reactor, the reactor was purged with nitrogen gas at a rate of 10 L/min to remove oxygen dissolved in the water, and a non-oxidizing atmosphere was created inside the reactor. Then, 40 mL of the 25 wt % NaOH aqueous solution and 870 mL of the 9 wt % $NH_4OH$ aqueous solution were input and stirred at a stirring speed of 550 rpm at 50° C. to adjust the pH inside the reactor to pH 12.2.

Afterward, the first aqueous transition metal solution, the NaOH aqueous solution, and the $NH_4OH$ aqueous solution were input into the reactor at 8 mol/hr, 16 mol/hr, and 2.4 mol/hr, respectively, and a precipitation reaction proceeded at pH 12 to 12.2 for 4 hours to induce the nucleation of a first positive electrode active material precursor particle.

Subsequently, the pH inside the reactor was adjusted to pH 11.6, then the first aqueous transition metal solution, the NaOH aqueous solution, and the $NH_4OH$ aqueous solution were input into the reactor at 8 mol/hr, 16 mol/hr, and 2.4 mol/hr, respectively, and a precipitation reaction proceeded at pH 11.6 for 28 hours to induce the growth of the first positive electrode active material precursor particle.

Meanwhile, when the reactor was full during the growth of the first positive electrode active material precursor particle, the first aqueous transition metal solution, NaOH aqueous solution, and $NH_4OH$ aqueous solution were input into the reactor while discharging a solvent, whose reaction was completed, to the outside of the reactor through a filter included in the reactor.

Subsequently, the supply of the first aqueous transition metal solution was stopped, the pH inside the reactor containing the first positive electrode active material precursor particle was adjusted to pH 12.6, the second aqueous transition metal solution, the NaOH aqueous solution, and the $NH_4OH$ aqueous solution were input into the reactor at 8 mol/hr, 16 mol/hr, and 2.4 mol/hr, and a precipitation reaction proceeded at pH 12.6 for an hour to induce the nucleation of a second positive electrode active material precursor particle.

Afterward, the pH inside the reactor was adjusted to pH 11.6, the second aqueous transition metal solution, NaOH aqueous solution, and $NH_4OH$ aqueous solution were input into the reactor at 8 mol/hr, 16 mol/hr, and 2.4 mol/hr, and a reaction proceeded at pH 11.6 for 47 hours to induce the simultaneous growth of the first positive electrode active material precursor particle and the second positive electrode active material precursor particle.

As a result, the finally prepared positive electrode active material precursor was a bimodal positive electrode active material precursor including: a first positive electrode active material precursor particle having a core-shell structure including a core part having a composition of $Ni_{0.73}Co_{0.07}Mn_{0.20}(OH)_2$ and a shell part formed on the surface of the core part and having a composition of $Ni_{0.65}Co_{0.12}Mn_{0.198}Zr_{0.002}(OH)_2$; and a second positive electrode active material precursor particle having a composition of $Ni_{0.65}Co_{0.12}Mn_{0.198}Zr_{0.002}(OH)_2$.

Comparative Example 1

A positive electrode active material precursor with large-sized particles, which has a core-shell structure, and a positive electrode active material precursor with small-sized particles were individually prepared and then mixed to prepare a bimodal precursor.

First, to prepare the positive electrode active material precursor with large-sized particles, in the same manner as in Example 1, a non-oxidizing atmosphere was created inside a reactor (70 L), then 40 mL of a 25 wt % NaOH aqueous solution and 870 mL of a 9 wt % $NH_4OH$ aqueous solution were input into the reactor, and stirring was performed at 50° C. at a stirring speed of 550 rpm to maintain the pH inside the reactor at pH 12.2. Then, the first aqueous transition metal solution, NaOH aqueous solution, and $NH_4OH$ aqueous solution were input into the reactor at 8 mol/hr, 16 mol/hr, and 2.4 mol/hr, and a reaction proceeded for 4 hours to induce the nucleation of a positive electrode active material precursor particle. Subsequently, the pH inside the reactor was adjusted to pH 11.6, the first aqueous transition metal solution, NaOH aqueous solution, and $NH_4OH$ aqueous solution were input, a reaction proceeded at pH 11.6 for 3 hours to induce the growth of the first positive electrode active material precursor particle, and the reactor became full. When the reactor was full, the first aqueous transition metal solution, NaOH aqueous solution, and $NH_4OH$ aqueous solution were input into the reactor while discharging a solvent, whose reaction was completed, to the outside of the reactor through a filter present in the reactor, and a reaction proceeded for 25 hours to induce the growth of the first positive electrode active material precursor particle, thereby forming a core part having an average composition of $Ni_{0.73}Co_{0.07}Mn_{0.2}(OH)_2$. Subsequently, the supply of the first aqueous transition metal solution was stopped, the second aqueous transition metal solution was supplied, and the positive electrode active material precursor particle was allowed to grow until a total reaction time became 80 hours, thereby forming a precursor with large-sized particles, which has an average particle diameter ($D_{50}$) of 10.8 μm and has a shell part having an average composition of $Ni_{0.65}Co_{0.12}Mn_{0.2}(OH)_2$ formed on the surface of the core part.

Next, to prepare a positive electrode active material precursor with small-sized particles, in the same manner as in Example 1, a non-oxidizing atmosphere was created inside a reactor (70 L), then 40 mL of a 25 wt % NaOH aqueous solution and 870 mL of a 9 wt % $NH_4OH$ aqueous solution were input into the reactor, and stirring was performed at 50° C. at a stirring speed of 550 rpm to maintain the pH inside the reactor at pH 12.2. Then, the second aqueous transition metal solution, NaOH aqueous solution, and $NH_4OH$ aqueous solution were input into the reactor at 8 mol/hr, 16 mol/hr, and 2.4 mol/hr, and a reaction proceeded for 4 hours to induce the nucleation of a positive electrode active material precursor particle. Subsequently, the pH inside the reactor was adjusted to pH 11.6, the second aqueous transition metal solution, NaOH aqueous solution, and $NH_4OH$ aqueous solution were input, and a reaction proceeded at pH 11.6 for 44 hours to induce the growth of the second positive electrode active material precursor particle, thereby forming a precursor with small-sized particles, which has an average composition of $Ni_{0.65}Co_{0.12}Mn_{0.2}(OH)_2$ and has an average particle diameter ($D_{50}$) of 3.8 μm.

The prepared positive electrode active material precursor with large-sized particles and positive electrode active material precursor with small-sized particles were mixed in a weight ratio of 70:30 to prepare a bimodal precursor.

Comparative Example 2

A positive electrode active material precursor with large-sized particles and a positive electrode active material precursor with small-sized particles were individually prepared and then mixed to prepare a bimodal precursor.

In this case, $NiSO_4$, $CoSO_4$, and $MnSO_4$ were mixed in water in amounts such that a molar ratio of nickel:cobalt:manganese was 70:10:20 to prepare a transition metal aqueous solution with a concentration of 2.4 M, and the transition metal aqueous solution was used to prepare a precursor with large-sized particles, which has a single composition, an average composition of $Ni_{0.7}Co_{0.1}Mn_{0.2}(OH)_2$, and an average particle diameter ($D_{50}$) of 10.8 μm, and a precursor with small-sized particles, which has an average composition of $Ni_{0.7}Co_{0.1}Mn_{0.2}(OH)_2$, and an average particle diameter ($D_{50}$) of 3.8 μm. A bimodal precursor was prepared in the same manner as in Comparative Example 1, except that the prepared two types of precursors were used.

Experimental Example 1: Evaluation of Characteristics of Positive Electrode Active Material Precursor The particle characteristics of the positive electrode active material precursor prepared in Example 1 and Comparative Examples 1 and 2 were evaluated.

Evaluation of Tap Density 100 mL of a container was filled with 50 g of each of the positive electrode active material precursor obtained in Example 1 and Comparative Examples 1 and 2, and then vibrated under constant conditions to measure the apparent density of particles. Specifically, the tap density of the positive electrode active material precursor was measured using a tap density tester (KYT-4000 commercially available from Seishin Enterprise Co., Ltd.). Measurement results are shown in the following Table 1.

Evaluation of Pellet Density

Each of the positive electrode active material precursor particles prepared in Example 1 and Comparative Examples 1 and 2 was compressed at a roll density of 2.5 kgf/cm² to prepare a pellet form, and the pellet density of the positive electrode active material precursor was measured using a density analyzer (4350L commercially available from Carver). Measurement results are shown in the following Table 1.

TABLE 1

|  | Tap density (g/cc) | Pellet density (g/cc) |
| --- | --- | --- |
| Example 1 | 2.24 | 2.91 |
| Comparative Example 1 | 2.19 | 2.83 |
| Comparative Example 2 | 2.17 | 2.81 |

As shown in Table 1, in the case of the positive electrode active material precursor prepared in the example of the present invention, it can be confirmed that tap density and pellet density were improved as compared to the positive electrode active material precursors prepared in the comparative examples.

Confirmation of Surface Characteristics of Positive Electrode Active Material Precursor The surface characteristics of the positive electrode active material precursors prepared in Example 1 and Comparative Examples 1 and 2 were confirmed using a scanning electron microscope.

FIGS. 1 to 3 show scanning electron microscope (SEM) images illustrating the surface characteristics of the positive electrode active material precursors prepared in Example 1 of the present invention and Comparative Examples 1 and 2, respectively.

As shown in FIGS. 1 to 3, it can be confirmed that, even when a positive electrode active material precursor with large-sized particles and a positive electrode active material precursor with small-sized particles were prepared in a single reactor as in the present invention, surface characteristics similar to those when a positive electrode active material precursor with large-sized particles and a positive electrode active material precursor with small-sized particles were individually prepared and then mixed (FIGS. 2 and 3) were exhibited.

Experimental Example 2: Confirmation of Particle Size Distribution

To confirm the particle size distribution of the positive electrode active material precursor particles prepared in Example 1 and Comparative Examples 1 and 2, the particle size of the positive electrode active material precursor prepared in Example 1 and Comparative Examples 1 and 2 was measured using a particle size distribution analyzer (S-3500 commercially available from Microtrac), and results thereof are shown in the following Table 2 and FIG. 4.

TABLE 2

|  | $D_{10}$ (μm) | $D_{50}$ (μm) | $D_{90}$ (μm) | $(D_{90} - D_{10})/D_{50}$ |
| --- | --- | --- | --- | --- |
| Example 1 | 3.42 | 10.29 | 14.71 | 1.10 |
| Comparative Example 1 | 6.66 | 10.10 | 13.84 | 0.71 |
| Comparative Example 2 | 3.03 | 9.36 | 13.52 | 1.12 |

Referring to Table 2, it can be confirmed that Example 1, in which a positive electrode active material precursor with large-sized particles and a positive electrode active material precursor with small-sized particles were prepared in a single reactor, exhibited a particle size distribution behavior similar to those in Comparative Examples 1 and 2 in which a positive electrode active material precursor with large-sized particles and a positive electrode active material precursor with small-sized particles were individually prepared and then mixed.

Meanwhile, from the particle size distribution result shown in FIG. 4, it can be confirmed that Example 1, in which a positive electrode active material precursor with large-sized particles and a positive electrode active material precursor with small-sized particles were prepared in a single reactor, exhibited two peaks. In this case, the first peak was regarded as the average particle diameter ($D_{50}$) of small-sized particles, the second peak was regarded as the average particle diameter ($D_{50}$) of large-sized particles, and the average particle diameters ($D_{50}$) at which the individual peaks appear are shown in the following Table 3.

TABLE 3

| | Average $D_{50}$ of small-sized particle (μm) | Average $D_{50}$ of large-sized particle (μm) |
|---|---|---|
| Example 1 | 3.43 | 11.45 |

Experimental Example 3: Confirmation of Firing Uniformity of Positive Electrode Active Material To confirm the firing uniformity of the positive electrode active materials prepared using the positive electrode active material precursors prepared in Example 1 and Comparative Examples 1 and 2, each of the positive electrode active material precursors prepared in Example 1 and Comparative Examples 1 and 2 was mixed with LiOH in a ratio of 1:1.03 (wt %), and the mixture was fired at 830° C. for 10 hours to prepare a bimodal positive electrode active material. Then, a secondary battery was manufactured using the prepared positive electrode active material, and the initial capacity and capacity retention rate of the secondary battery were checked.

In this case, the secondary battery was manufactured by the following method, except that each of the positive electrode active materials prepared according to Example 1 and Comparative Examples 1 and 2 was used. Specifically, each of the positive electrode active materials prepared according to Example 1 and Comparative Examples 1 and 2, carbon black (Super-P) as a conductive material, and KF1100 (Kureha Corporation) as a binder were mixed in a weight ratio of 92.5:3.5:4.0 in a N-methyl pyrrolidone (NMP) solvent to prepare a composition for forming a positive electrode. The composition for forming a positive electrode was applied onto a 20 μm-thick Al current collector, dried, roll-pressed to manufacture a positive electrode. The manufactured positive electrode and Li metal as a negative electrode were stacked with a 20 μm-thick monolayer separator to manufacture a coin-type battery by a typical method. Then, the coin-type battery was placed in a battery case, and an electrolyte, which was obtained by dissolving 1 M $LiPF_6$ in a solvent mixture prepared by mixing ethylene carbonate, ethyl methyl carbonate, and diethyl carbonate in a volume ratio of 3:4:3, was injected thereto, thereby manufacturing lithium secondary batteries according to Example 1 and Comparative Examples 1 and 2.

The lifetime characteristics of the manufactured lithium secondary batteries according to Example 1 and Comparative Examples 1 and 2 were measured.

Specifically, each of the lithium secondary batteries manufactured according to Example 1 and Comparative Examples 1 and 2 was charged at 25° C. in the CC/CV mode of 0.2 C up to 4.3 V (end current: 1/20C) and discharged at a constant current of 0.2 C up to 3.0 V, and then initial charge and discharge capacities were measured. Afterward, charging was performed at a constant current of 0.5 C up to 4.3 V (1/20C cut off), and discharging was performed at a constant current of 1.0 C up to 3.0 V. The charging and discharging processes were set as one cycle and repeated for 50 cycles, and the lifetime characteristics of the lithium secondary batteries according to Example 1 and Comparative Examples 1 and 2 were measured. Results thereof are shown in the following Table 4.

TABLE 4

| | Initial discharge capacity (mAh/g) | Capacity retention rate at $50^{th}$ cycle (%) |
|---|---|---|
| Example 1 | 193.9 | 98.1 |
| Comparative Example 1 | 193.5 | 97.7 |
| Comparative Example 2 | 192.0 | 96.8 |

As shown in Table 4, it can be confirmed that the initial discharge capacity of the secondary battery manufactured using the positive electrode active material precursor of Example 1 was superior to that in Comparative Example 1 in which a precursor with large-sized particles and a precursor with small-sized particles, which have the same composition as in Example 1, were individually synthesized in different reactors and then mixed.

Therefore, it can be seen that the firing uniformity of the bimodal positive electrode active material prepared by the method according to the present invention is excellent.

The invention claimed is:

1. A bimodal positive electrode active material precursor comprising:
   a first positive electrode active material precursor particle having a core-shell structure; and
   a second positive electrode active material precursor particle having a smaller average particle diameter ($D_{50}$) than the first positive electrode active material precursor particle,
   wherein a core part of the first positive electrode active material precursor particle has a composition represented by the following Chemical Formula 1,
   wherein a shell part of the first positive electrode active material precursor particle and the second positive electrode active material precursor particle have a composition represented by the following Chemical Formula 2, and
   wherein the composition represented by Chemical Formula 1 is different from the composition represented by Chemical Formula 2:

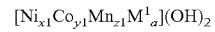
   [Chemical Formula 1]

$[Ni_{x1}Co_{y1}Mn_{z1}M^1_a](OH)_2$

   [Chemical Formula 2]

$[Ni_{x2}Co_{y2}Mn_{z2}M^2_b](OH)_2$ in Chemical Formula 1 and Chemical Formula 2,
   $M^1$ and $M^2$ are each independently one or more selected from among Zr, B, W, Mo, Cr, Al, Ti, Mg, Ta, and Nb,
   $0.6 \leq x1 \leq 1.0$, $0 \leq y1 \leq 0.4$, $0 \leq z1 \leq 0.4$, $0 \leq a < 0.1$, and $x1+y1+z1+a=1$,
   $0.6 \leq x2 \leq 1.0$, $0 \leq y2 \leq 0.4$, $0 \leq z2 \leq 0.4$, $0 \leq b < 0.1$, and $x2+y2+z2+b=1$, and
   at least one of a or b exceeds 0.

2. The bimodal positive electrode active material precursor of claim 1, wherein $M^1$ and $M^2$ are independently one or more selected from among Zr, Al, B, and W.

3. The bimodal positive electrode active material precursor of claim 1, wherein a=0, and b satisfies $0.0001 \leq b \leq 0.05$.

4. The bimodal positive electrode active material precursor of claim 1, wherein the first positive electrode active material precursor particle has an average particle diameter ($D_{50}$) of 8 μm to 15 μm, and the second positive electrode active material precursor particle has an average particle diameter ($D_{50}$) of 1 μm or more and less than 8 μm.

5. The bimodal positive electrode active material precursor of claim 1, wherein the bimodal positive electrode active material precursor has a tap density of 2.0 g/cc to 2.5 g/cc.

6. The bimodal positive electrode active material precursor of claim 1, wherein the bimodal positive electrode active material precursor has a pellet density of 2.0 g/cc to 3.0 g/cc, wherein the pellet density is measured after the positive electrode active material precursor is compressed at a roll density of 1.0 kgf/cm$^2$ to 5.0 kgf/cm$^2$ to prepare a pellet form.

7. A positive electrode active material obtained by firing the bimodal positive electrode active material precursor of claim 1 and a lithium source material.

8. A positive electrode comprising the positive electrode active material of claim 7.

9. An electrochemical device comprising the positive electrode of claim 8.

* * * * *